United States Patent
Boltunov

[11] Patent Number: 6,058,411
[45] Date of Patent: May 2, 2000

[54] METHOD AND DEVICE FOR COMPUTING PRODUCT SUMS

[75] Inventor: Aleksandr Jurievich Boltunov, Tashkent, Uzebkistan

[73] Assignees: Rashid Bakievich Khalidov; Alisher Vahidovich Shaihov, both of Tashkent, Uzebkistan; Lancaster, Technologies, LLC., San Francisco, Calif.

[21] Appl. No.: 08/945,283
[22] PCT Filed: Apr. 11, 1996
[86] PCT No.: PCT/RU96/00088
§ 371 Date: Oct. 14, 1997
§ 102(e) Date: Oct. 14, 1997
[87] PCT Pub. No.: WO96/32676
PCT Pub. Date: Oct. 17, 1996

[30] Foreign Application Priority Data

Apr. 12, 1995 [UZ] Uzebkistan ............................. 9500374
Apr. 14, 1995 [UZ] Uzebkistan ............................. 9500383
Apr. 18, 1995 [UZ] Uzebkistan ............................. 9500393
May 6, 1995 [UZ] Uzebkistan ............................. 9500446

[51] Int. Cl.[7] ...................................................... G06F 7/00
[52] U.S. Cl. ............................................................ 708/603
[58] Field of Search .................................. 364/602, 807, 364/750.5; 708/603, 2, 801

[56] References Cited

U.S. PATENT DOCUMENTS

4,215,419 7/1980 Majerski ............................. 364/760.01
5,305,250 4/1994 Salam et al. ............................. 364/807
5,602,766 2/1997 Bauer et al. ......................... 364/750.5

*Primary Examiner*—Tan V. Mai
*Attorney, Agent, or Firm*—Abelman, Frayne & Schwab

[57] ABSTRACT

The invention pertains to the field of computing technology and microelectronics and is useful in producing high-speed integrated circuits and sets of integrated circuits for digital processing of signals, for computing product sums, and for multiplication and addition processes. The inventive method essentially comprises sending a set of values of the electrical parameter of a signal into transmission channels, the number m of which corresponds to the unloading of terms. A computation system, to which corresponds the number n, determines the number of all possible combinations of the set of l/m values of the signal's electrical parameter, which values are sent into a transmission channel according to their weighting. The set of l/m values of the electrical parameter of the signal is sent through a divide-by-n circuit, while transmission is effected from the previous transmission channel to the input of the next transmission channel. The results are obtained at the output of the (m+l) transmission channels as a sequence of the set of values of the electrical parameter. The inventive device includes p blocks each comprising serially mounted first type members having a divide-by-n function, as well as second type members having a single memory discharge.

5 Claims, 6 Drawing Sheets

| | | | |
|---|---|---|---|
| 0 | 1 0 1 0 1 0 1 0 | 0 0 0 0 0 0 0 0 | 0 0 0 0 0 0 0 0 |
| 1 | 0 1 0 1 0 1 0 1 | 0 0 0 0 0 0 0 0 | 0 0 0 0 0 0 0 0 |
| 2 | 0 1 0 1 0 1 1 1 | 0 0 0 0 0 0 0 0 | 0 0 0 0 0 0 0 0 |
| 3 | 1 0 1 0 1 1 1 0 | 1 1 0 1 1 1 1 0 | 1 1 0 1 1 1 1 0 |
| 4 | 1 1 1 0 1 0 1 0 | 1 1 1 1 1 1 1 1 | 1 1 1 1 1 1 1 0 |
| 5 | 1 0 1 1 1 0 1 0 | 1 1 1 1 1 1 1 1 | 1 1 1 1 1 1 1 1 |
| 6 | 1 1 0 1 0 1 0 1 | 1 1 1 1 1 1 1 1 | 1 1 1 1 1 1 1 1 |
| 7 | ⌐0 1 0 1 1 1 0 1 | ⌐1 1 1 1 1 1 1 1 | ⌐0 0 0 0 0 0 0 0 |
| 8 | ⌊→0 0 0 0 0 0 0 0 | ⌊→0 0 0 0 0 0 0 0 | ⌊→1 0 0 0 0 0 0 0 |
| | ──────── LOAD ──────── | | 1-st cycle |

| | | | |
|---|---|---|---|
| 0 | 0 0 0 0 0 0 0 0 | 0 0 0 0 0 0 0 0 | 0 0 0 0 0 0 0 0 |
| 1 | 0 0 0 0 0 0 0 0 | 0 0 0 0 0 0 0 0 | 0 0 0 0 0 0 0 0 |
| 2 | 0 0 0 0 0 0 0 0 | 0 0 0 0 0 0 0 0 | 0 0 0 0 0 0 0 0 |
| 3 | 0 0 0 0 0 0 0 0 | 0 0 0 0 0 0 0 0 | 0 0 0 0 0 0 0 0 |
| 4 | 1 1 0 1 1 1 1 0 | 1 1 0 1 1 1 1 0 | 0 0 0 0 0 0 0 0 |
| 5 | 1 1 1 1 1 1 1 0 | 1 1 1 1 1 1 1 0 | 1 1 0 1 1 1 1 0 |
| 6 | 1 1 1 1 1 1 1 1 | 1 1 1 1 1 1 1 0 | 1 1 1 1 1 1 1 0 |
| 7 | ⌐1 1 1 1 1 1 1 1 | ⌐0 0 0 0 0 0 0 0 | ⌐1 1 1 1 1 1 1 0 |
| 8 | ⌊→1 0 0 0 0 0 0 0 | ⌊→0 1 0 0 0 0 0 0 | ⌊→0 1 0 0 0 0 0 0 |
| | 2-nd cycle | 3-rd cycle | 4-th cycle |

| | | | |
|---|---|---|---|
| 0 | 0 0 0 0 0 0 0 0 | 0 0 0 0 0 0 0 0 | 0 0 0 0 0 0 0 0 |
| 1 | 0 0 0 0 0 0 0 0 | 0 0 0 0 0 0 0 0 | 0 0 0 0 0 0 0 0 |
| 2 | 0 0 0 0 0 0 0 0 | 0 0 0 0 0 0 0 0 | 0 0 0 0 0 0 0 0 |
| 3 | 0 0 0 0 0 0 0 0 | 0 0 0 0 0 0 0 0 | 0 0 0 0 0 0 0 0 |
| 4 | 0 0 0 0 0 0 0 0 | 0 0 0 0 0 0 0 0 | 0 0 0 0 0 0 0 0 |
| 5 | 1 1 0 1 1 1 0 0 | 0 0 0 0 0 0 0 0 | 0 0 0 0 0 0 0 0 |
| 6 | 1 1 1 1 1 1 1 0 | 1 1 0 1 1 1 0 0 | 1 0 1 1 1 0 0 0 |
| 7 | ⌐0 0 0 0 0 0 0 0 | ⌐1 1 1 1 1 1 1 0 | ⌐0 0 1 0 0 0 1 0 |
| 8 | ⌊→1 1 0 0 0 0 0 0 | ⌊→1 1 0 0 0 0 0 0 | ⌊→0 0 1 0 0 0 0 0 |
| | 5-th cycle | 6-th cycle | 7-th cycle |

| | | | |
|---|---|---|---|
| 0 | 0 0 0 0 0 0 0 0 | 0 0 0 0 0 0 0 0 | |
| 2 | 0 0 0 0 0 0 0 0 | 0 0 0 0 0 0 0 0 | |
| 3 | 0 0 0 0 0 0 0 0 | 0 0 0 0 0 0 0 0 | |
| 4 | 0 0 0 0 0 0 0 0 | 0 0 0 0 0 0 0 0 | |
| 5 | 0 0 0 0 0 0 0 0 | 0 0 0 0 0 0 0 0 | |
| 6 | 0 0 0 0 0 0 0 0 | 0 0 0 0 0 0 0 0 | |
| 7 | ⌐1 1 0 1 1 0 1 0 | ⌐1 1 0 1 1 0 1 0 | *FIG.5* |
| 8 | ⌊→0 0 1 0 0 0 0 0 | ⌊→0 0 1 0 0 0 0 0 | |
| | 8-th cycle | Result | |

|   |            |            |            |
|---|------------|------------|------------|
| 0 | 10011001   | 00000001   | 00000001   |
| 1 | 00000000   | 00000000   | 00000000   |
| 2 | 10011001   | 00000001   | 00000001   |
| 3 | 00000000   | 00000001   | 00000001   |
| 4 | 00000000   | 00000011   | 00000001   |
| 5 | 10011001   | 00000001   | 00000010   |
| 6 | 00000000   | 00001001   | 00000001   |
| 7 | 0 00000000 | 0 00100111 | 0 00101011 |
|   | ——— LOAD ——— | | 1-st cycle |

|   |            |            |            |
|---|------------|------------|------------|
| 0 | 00000001   | 00000001   | 00000001   |
| 1 | 00000000   | 00000000   | 00000000   |
| 2 | 00000001   | 00000001   | 00000001   |
| 3 | 00000001   | 00000001   | 00000001   |
| 4 | 00000001   | 00000001   | 00000001   |
| 5 | 00000000   | 00000000   | 00000000   |
| 6 | 00000010   | 00000100   | 00000000   |
| 7 | 0 00101011 | 0 00101010 | 0 00101100 |
|   | 2-nd cycle | 3-rd cycle | 4-th cycle |

METHOD AND DEVICE FOR COMPUTING PRODUCT SUMS

BACKGROUND OF THE INVENTION

1. Field of the Invention

The invention pertains to the field of computing technology and microelectronics and is useful in producing high-speed integrated circuits and sets of integrated circuits for digital signal processing, for computing product sums, for multiplication and addition processes.

2. Description of the Related Art

The device for computing product sums is known, containing eight 2-bit input data bus, sixteen input buffer elements, four 2-bit conveyer adders of the first layer, 4 blocks of results normalization of the first layer, two conveyor adders of the second layer, two blocks of results normalization of the second layer, output conveyor adder of the third layer, two intermediate flip-flops, output normalization block, two output buffer flip-flops, two output buffer elements, input of the main clocking signals, "end of word" input signal, control signal input, control block including shifter, two one-bit result outputs, each adder includes two output flip-flops, a carry flip-flop and combinational two-bit adder consisting of two combination 1-bit complete adders, input of the main clocking signal, "end of word" signal input, two one-bit outputs, each of normalization blocks of the first and second layer includes delay flip-flop, controlling "end of word" input, commutator, two one-bit inputs and two one-bit outputs, normalization block of the third layer includes one-bit charge inputs: "end of word" input, control signal input, two delay flip-flops, two commutators, And - No gate, control block shifter includes seven flip-flops, elements connections are organized in the order of their listing ([1], p. 107–125).

The described device realizes the principle (for case m=0):

$$C = \sum_{i=0}^{7} A_i * 2^m = \sum_{i=0}^{7} \sum_{j=0}^{n-1} a_{ij} * 2^{m+j}$$

Here

C—computing product sums results.

$A_i$—i of operand;

$2^m$—weighting of operand $a_{ij}$-j—bit of Ai operand $2^{m+j-}$ weighting of $a_{ij}$ bit n—capacity of operands $A_i$ However, the described device can't computing product sums of $A_i \times 2^{i-}$ type or sums of partial products of $a_1^x b_j^x 2^{i+j}$ type and so can't be applied in multipliers.

The device for computing product sums is known, working in two modes: computation of partial product sums of two pairs of 8-bit numbers, computation of one pair of 16-bit numbers. The device is two-channel with processing of two bits in clock cycle in each channel.

The device includes four blocks of adders, six conversion circuits of the direct code into compliment, two full 2-bit adders with carry storage, two normalization blocks, sign digit circuit, control block, four output buffer flip-flops, clocking signal input, "end of word" character accompanying signal input, initial set signal input, working mode selection input, two 2-bit output data bus, each adder block includes seven 2-bit conveyer adders with carry storage, each device adder includes 5 flip-flops, two full 1-bit combinational adders, four one-bit inputs, two one-bit outputs, each circuit of the converter of the direct code into complement includes four flip-flops, two commutators, analysis circuit, four 1-bit inputs, two 1-bit outputs, the sign digit circuit includes six flip-flops, one EXCLUSIVE OR gate, four 1-bit data inputs, signal input of "end of word" character accompaning, five 1-bit outputs, each normalization block includes three flip-flops, one commutator, control strobe of character dump, two 1-bit inputs, two one-bit outputs, all elements are connected in the following sequence: four blocks of adder, four code converters, two adders, two normalization blocks, two code convertors, four input buffer flip-flops ([1], p. 54–84).

The device computes partial product sums of $a_i * b_j$ type i.e. realizes the principle:

$$C = \sum_{i=0}^{n-1} \sum_{j=0}^{n-1} a_i * b_j * 2^{i+j},$$

Here

C—result of computing product sums;

$a_i$-i—bit of A operand;

$b_j$-j—bit of B operand;

$a_i * b_j$—partial products;

$2^{i+j-}$ partial product weighting;

n—capacity of operands.

However the device doesn't form partial $a_i * b_j$ products and so can't be complete functional block for multiplication.

The device for computing product sums is known, working in two modes; computing of 16-bit numbers products; computing of two product sums of 8-bit numbers. The device includes the above mentioned device as well as eight input buffer flip-flops, four 8-bit (two including four) working registers of reception and storage of input operands, two impulse allocators, two circuits of partial product formation, two commutators of partial product, three other commutator, input of storage mode selection; each circuit of partial product formation includes four AND gates blocks and four delay flip-flops, each block includes four AND gates ([1], p. 54–84). Devices described above are industrial patterns of BIC K1815BФ1 and K1815IM1 of the speed microprocessor BIC set of K1815 series for digital signal processing.

Description of these devices in the directory is completely based on the inventions descriptions to author's certificates the authors of most of them are the directory's authors [2]. Complete comparative analysis of methods, procedures, adders, multipliers, for speed BIC sets building for digital signals processing is given in the directory, and considered parallel pipelining principles of computing organization are applied in the best world analogous up to the present time.

However is can be seen from principles of devices function that maximum speed and productivity can be achieved if n-capacities are processed in each clock cycle under condition that operands capacity is n, but herewith the hardware expenses increases sharply, particular those which are necessary for adders trees building. Data processing in parallel-sequential code creates technical complexity for records of summands weightings, creates the necessity of circuits availability for parallel code conversion into parallel-sequential code as ADC give the number in the parallel code.

The best world analogous of devices, capable to carry out functions of computing product sums can be divided into two classes:

high-speed specialized, sectional processors with parallel and parallel-pipelining data processing but these devices have limited functional capabilities and large hardware expenses;

one-crystal programmable processors but they have unsufficient speed for data processing in real time scale [3].

BRIEF SUMMARY OF THE INVENTION

The purpose of the invention is the throughput and speed increase at the reduction of hardware expenses and global simplification of the circuit at the expansion of the device capacities functions.

The set goal is solved by the way that the method of computing product sums according to the invention includes the following: k sets (k=2, 3, . . . ) l values of the signal parameter (l=1, 2, . . . ), are sent to transmission channels the number whereof is m(m=1,2, . . . ) with divide-by-n circuit on n(n=2,3, . . . ), herewith k number corresponds to the number of summands, m number corresponds to summands capacity, n number corresponds to the computing system which is also determined by the number of possible combinations of set l/m (1 is divide-by-m) values of the signal parameter, herewith each such set is passed to the transmission channel, corresponding to its weighting, sets of l/m values of the signal parameter, passed circuit of divide-by-n of the previous channel are sent to the input of the next transmission channel, last transmission channel to the input of the overflow transmission channel; the result is obtained as one sequence of sets of l/m values of signal parameter in output of (m+1) transmission channels.

The set goal is solved by the way that the device for computing product sums by the method contains p blocks (p=1,2, . . . ), each whereof includes $q_p$ elements of two types ($q_p$=2,3, . . . ) whereof $m_p+r_p$ elements of the first type ($r_p$=1,2, . . . ), each element of the first type of $m_p$ number, together with elements of the second type forms transmission channel with the circuit of divide-by-n, herewith the function of the circuit of divide-by-n is carried out by the element of the first type, the element of the second type carries out the function of the single memory discharge if the next transmission channel element is the element of the second type and its state is non-vanishing in all other cases element of the second type serves as a conductor, $r_p$ elements form overflow channel, all elements are connected in sequence.

As applied to the work with binary digits the element of the first types contains on the information input, counting input, information output, zero output, the element of the second type contains on the information input, input of hop, record signal input, information output, output of hop.

The solution is the development of the following elements of the first and second types have clocking input. The availability of the clocking input allows to increase the reliability and speed of the device in a whole.

The alternative is the following solution: elements of the first and second types are combined into the element of the single type, with the capability of the realization of the function of elements of the first and second types depending on the working inputs and outputs. Their solution can increase the hardware expenses, but increases the regularity coefficients and uniformity of the computing structure, simplifies the manufacture of devices on the BIC, SBIC basis.

The following solution is also the development of all elements, having output, at the output whereof the results is registered are connected with the block of formation of signal of ready and output of result, which reacts on the cessation of the state change of the elements of the first type in the automated mode (without the elements clocking in each clock cycle) and in clocking mode (with elements clocking in each clock cycle), the block is connected with the output data bus. Such solution allows to increase speed in such cases, when the result is obtained before the appointed time.

As applied to computing sums of $k_p$ $m_p$ capacity summands the device for computing products sums (for cases p=1) is made in a form of rectangle matrix $k_p$x$m_p$ c $r_p$ supplements ($r_p$=log $_{np}k_p$), elements of the first type are located in the last line of the matrix, connections between elements are organized on matrix columns in direction to elements of the first type, last element of each transmission channel, which form matrix columns, connected with the first element of the transmission channel, which forms the next matrix column, such as all elements are connected in sequence, herewith the supplements are connected last, all matrix elements have external input, all elements of the last line and the supplement having external output. The same version of the device design can work as a accumulating adder, if the number of supplements $r_p$ and number of all summand $k_p$ is in the following dependence $r_p$=$\log_{np} k_p$. For binary digits $r_p$ supplements are connected with the accelerated transmission circuit.

As applied to the computing partial product sums products of one pair of $m_p$-capacity operands the device for computing product sums (for case p=1) is designed in a form of $m_p$*$m_p$ matrix with one supplement, elements of the first type are arranged in the last column and in the last matrix line, links in the matrix are organized on diagonals in the direction to elements of the first type thus forming the transmission channels, all matrix elements have external input, all elements of the last column and last line and the supplement have external output.

As applied for multiplication of one pair $m_p$-capacity operands the device for computing product sums additionally includes (for case p=1) $m_p$-capacity input bus data of the register of a multiplicand, $m_p$-capacity input bus data of the register of a multiplier, input of sign digits, input of working mode selection, $m_p$-capacity register of a multiplicand, $m_p$-capacity register of a multiplier, $m_p$ circuit of partial products formation, $m_p$-a circuit of sign digit processing, the working mode selection and clocking circuit, each $m_p$ circuit of partial products formation forms a number, corresponding to the multiplication result of $m_p$-capacity miltiplier by multiplicand, input data buses are connected with corresponding registers, output of all register capacities of a multiplicand are connected with $m_p$-capacity inputs of all partial products formation circuits, the output of $m_p$-capacity of the multiplier register is connected with single capacity input of $m_p$-partial products formation circuit, the output of each partial products formation circuit is connected with the correspondent input of the circuit for computing partial product sums.

The circuit of working mode and clocking selection provide links between p channels, thus providing the working mode.

The device for computing product sums carries out multiplication according to the following principle:

$$C = A * B = A * \sum_{i=0}^{n-1} b_i * 2^i,$$

here

C—computing product sums results;
A—multiplicand;
B—multiplier;
$b_i$- i—multiplier capacity;
$A*b_i$—partial product;
$2^i$—partial product weighting;
n—a multiplier capacity.

As applied to binary numbers the partial product formation circuit includes $m_p$ elements of AND, first inputs whereof are divided and represent the multi-bit input of the circuit, second inputs are combined in one single capacity input of the circuit, outputs of AND elements represent multi-bit output of the circuit.

As applied to the digital signal processing and capability to provide the parallel-conveyor working mode the device for computing products sums additionally includes common data bus, s inputs of the analogs signal (s=1,2, ... ) input of the working mode selection, $p_1$ accumulating adders ($p_1$=1, 2, ... ), memory block, s analog-digit convertors, t digit-analog converters, the working mode selection and clocking circuit, p output data buses, t outputs of analog signal, the common data bus in connected with all other data buses, output of s-analog-digit converter is connected with both input data buses of p-registers of a multiplicand and multiplier, output of p-circuit for computing partial products is connected with $p_1$ accumulating adders, output of $p_1$-accumulating adder is connected with p-output data bus, which is connected with input of t digit-analog converter. Applied for binary digits the adder is connected with circuit of the accelerated transmission.

The invention in comparison to the functional analog has the following technical result:

increase of speed (reduction of delay);
increase of throughput;
reduction of hardware expenses;
architectural flexibility and circuit simplification (circuit uniformity and regularizing);
expansion of functional capabilities.

The essence of distinctive features in that data processing is carried out in the parallel code simultaneously with all capacities.

The advantages of the invention are improved as it develops.

If given binary numbers are being processed, which are presented in a form of discrete binary voltage levels then for computing of $k_p$ $m_p$-capacity summands $2*k_p$ clock cycles will be required, herewith the clock cycle time corresponds to time of switching of typical logic element;

computing partial product sum of one pair of $m_p$-bit numbers will require $2*m_p$ clock cycles herewith the clock-cycle time corresponds to time of switching of the typical logic elements;

computing of one pair of $m_p$-bit numbers will require $2*m_p+2$ clock cycle herewith the clock cycle time corresponds to time of switching of typical logic element.

Advantages of the invention are improved if algorithm of author's transformation is applied therein (the essence whereof is the basis-polynomial).

In comparison with speed real Fourier transform, speed Hartley transform Basis-Polynomial transform has some advantages whereof are the following:

strengthening of computing efficiency ( considerable reduction of operations number of multiplication and addition, occupied memory capacity);

absolute accuracy of signals reproduction without noise which can be described by of polynome.

$$F(t) = \sum_{k=0}^{n} a_k * t^k \text{ (including dynamic signals)}.$$

Here t—time;
$a_k$—polynomial coefficient;
n—number of polynome members simplicity of signal description adgustment to polynomial form;

improvement of the characteristic of signal-to-noiseratio at the filtration with less discretization frequency;

possibility to determine weighting, polynomial coefficients on same algorithm $$K = \sum_{i=0}^{n} X_i * Y_i$$

here $X_i$—i of multiplicand;
$Y_i$—i of multiplier;
n—number of product sum.

The conversion is expressed in formula of links between discrete values of signal parameter and weighting coefficients:

$K_0$=f(0)
$K_1$=f(1)−f(0)
$K_2$=½f(0)−f(⅔)+½f(1)
$K_3$=−⅜f(0)+f(⅓)−⅜f(⅔)+⅛f(1)

between polynomial coefficients and weighting coefficients:

$A_3$=21.[3]$K_3$
$A_2$=−32$K_3$+4$K_2$
$A_1$=10.[6]$K_3$−4$K_2$+$K_1$
$A_0$=$K_0$ between polynomial coefficients and discrete values of the signal parameter:

$A_3$=−8f(0)+21.[3]f(⅓)−16f(⅔)+2.[6]f(1)
$A_2$=14f(0)−32f(⅓)+20f(⅔)−2f(1)
$A_1$=−7f(0)+10.[6]f(⅓)−4f(⅔)+0.[3]f(1)
$A_0$=f(0)

This is particular of transform cases. Depending on the working mode selection the device can compute one or several product sums, expressed by various formula, for example such as:

$$F_1 = \sum_{i=0}^{n-1} a_i * b_i, \ F_2 = \sum_{N=0}^{M} N!, \ F_3 = a^2 + a*b + b^2,$$

The device can carry out functions of specialized processors, such as filtration, compression, diagnostics of states and passes, coding and identification.

DETAILED DESCRIPTION OF THE INVENTION

To implement the method invention it is necessary that numbers are represented in a form of k sets l discrete values of the signal parameter herewith the signal can be both analogous and discrete, these sets are passed to transmission channels, the number whereof is m, with divide-by-n circuit , number n corresponds to the computation system wherein numbers are presented, computation system is determined by various combinational sets of l/m signal parameter values, each set of l/m signal parameter values is passed to the transmission channel corresponding to the weighting thereof, if information capacity in the channel exceeds the capacity of the last channel element, then such element having divide-by-n circuit and its output is connected with the input of the next transmission channel, the last channel is the overflow transmission channel, such channel depending on the possible overflow of previous channel can have several circuits on divide-by- n, several external outputs.

For hardware realization of the procedure in common case it is necessary to have elements of two types, elements of the first type carries out function on circuit divide-by- n, elements of the second type carries out the function either single memory discharge or conductors, depending on filling the transmission channel in next communication elements, if the channel is free then single capacity data passes to the input of the circuit divide-by- n at once.

Figure 1:
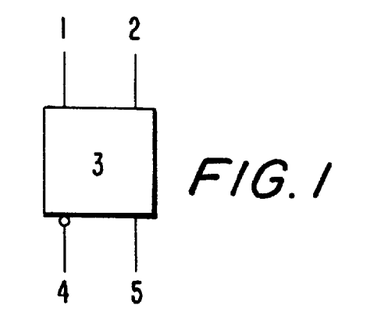
FIGS. 1 and 2 shows elements correspondingly of the first and second types for the work with binary numbers, FIG. 3 gives the structural circuit of the device applicable to the parallel addition of $k_p$ $m_p$-capacity summands.
Figure 2:
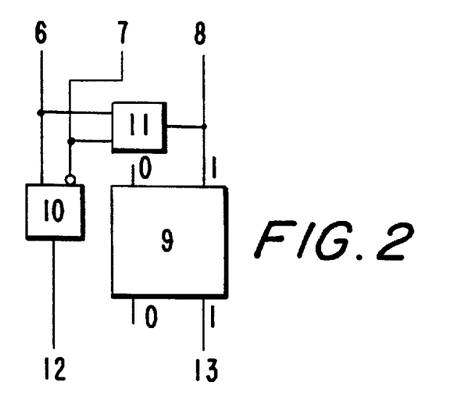

As applied for the work on binary numbers presented in a form of discrete binary voltage levels in the device for computing product sums the element of the first types contains on information input 1, counting input 2, T flip-flop 3, zero input 4, information output 5 i.e. is T flip-flop with binary logic (FIG. 1), the element of the second types contains input of hop 6, input of signal record 7, information input 8, flip-flop 9, two AND gates 10, 11, output of hop 12, information output 13 (FIG. 2) Links are organized in such a way that information received at input 6 passes by transit to input 12, to input 8 is recorded on flip-flop 9. The level of logical "1" received on input 7 closes AND gate 10 and opens AND gate 11 and information in this case received on input 6 is recorded on flip-flop 9, i.e. input 7 and AND gates 10, 11 carries out functions of single capacity commutator.

Figure 3:
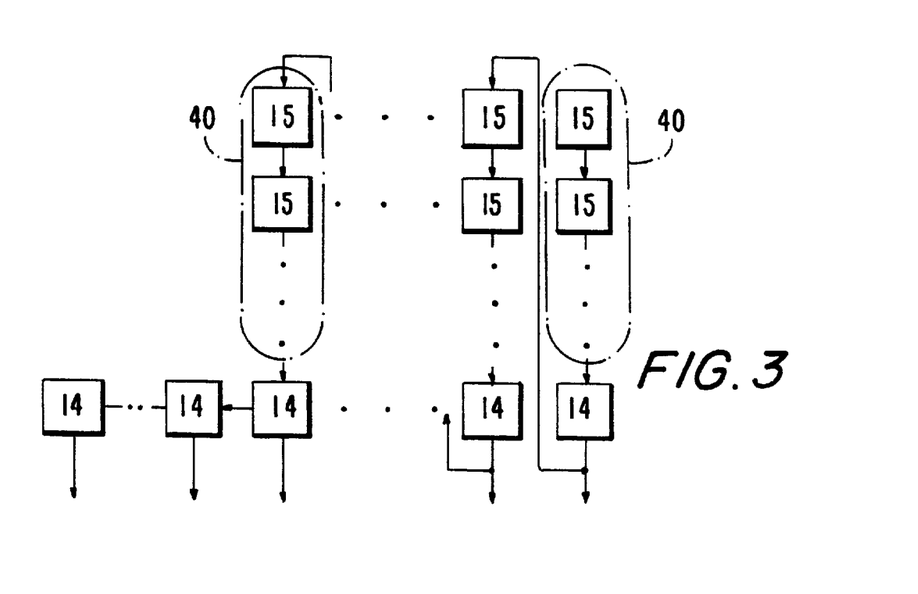

The device for computing products sums as to be applied for parallel addition includes elements of first type 14, elements of second type 15 forming transmission channels 40, links between them are organized in such a way as shown in FIG. 3.

Figure 4:
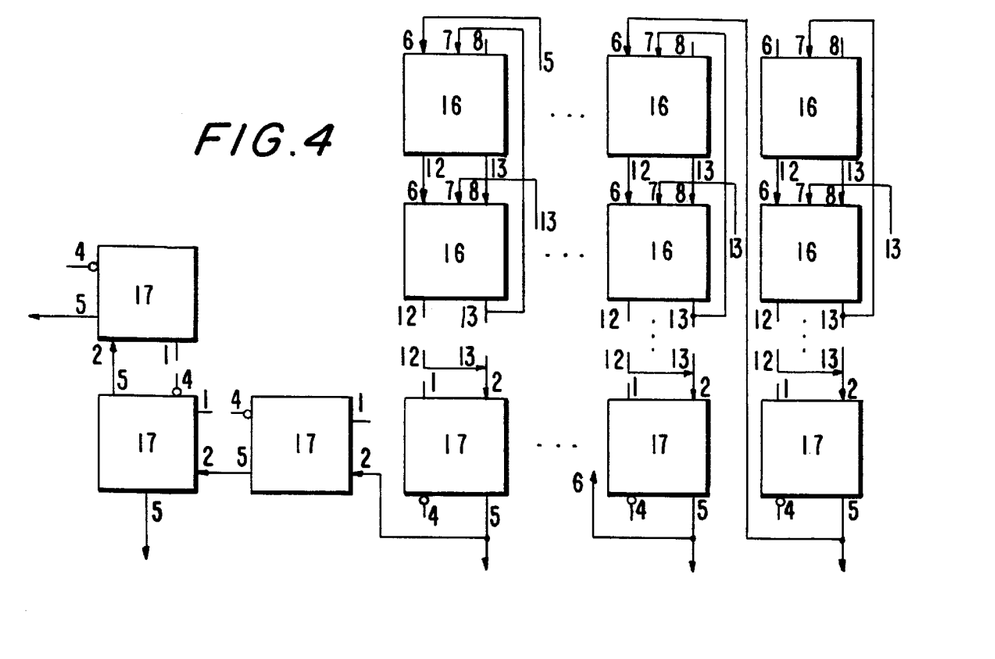
FIG. 4 presents the circuit of the device for parallel addition of eight 8-bit binary numbers.

As applied for binary numbers the device includes elements of second type 16, elements of first type 17 (FIG. 4). Element 17 is the element, given in FIG. 1, element 16 is the element, given in FIG. 2.

The device works in a following way: example the 8-bit numbers shall be added:

$$(10101010)_2 = (170)_{10}, \ (01010101)_2 = (85)_{10}, \ (01010111)_2 = (87)_{10},$$
$$(10101110)_2 = (174)_{10}, \ (11101010)_2 = (234)_{10},$$
$$(10111010)_2 = (186)_{10}, \ (11010101)_2 = (213)_{10},$$
$$(01011101)_2 = (93)_{10}(170 + 85 + 87 + 174 + 234 + 186 + 213 + 93 = 1242).$$

Figure 5:
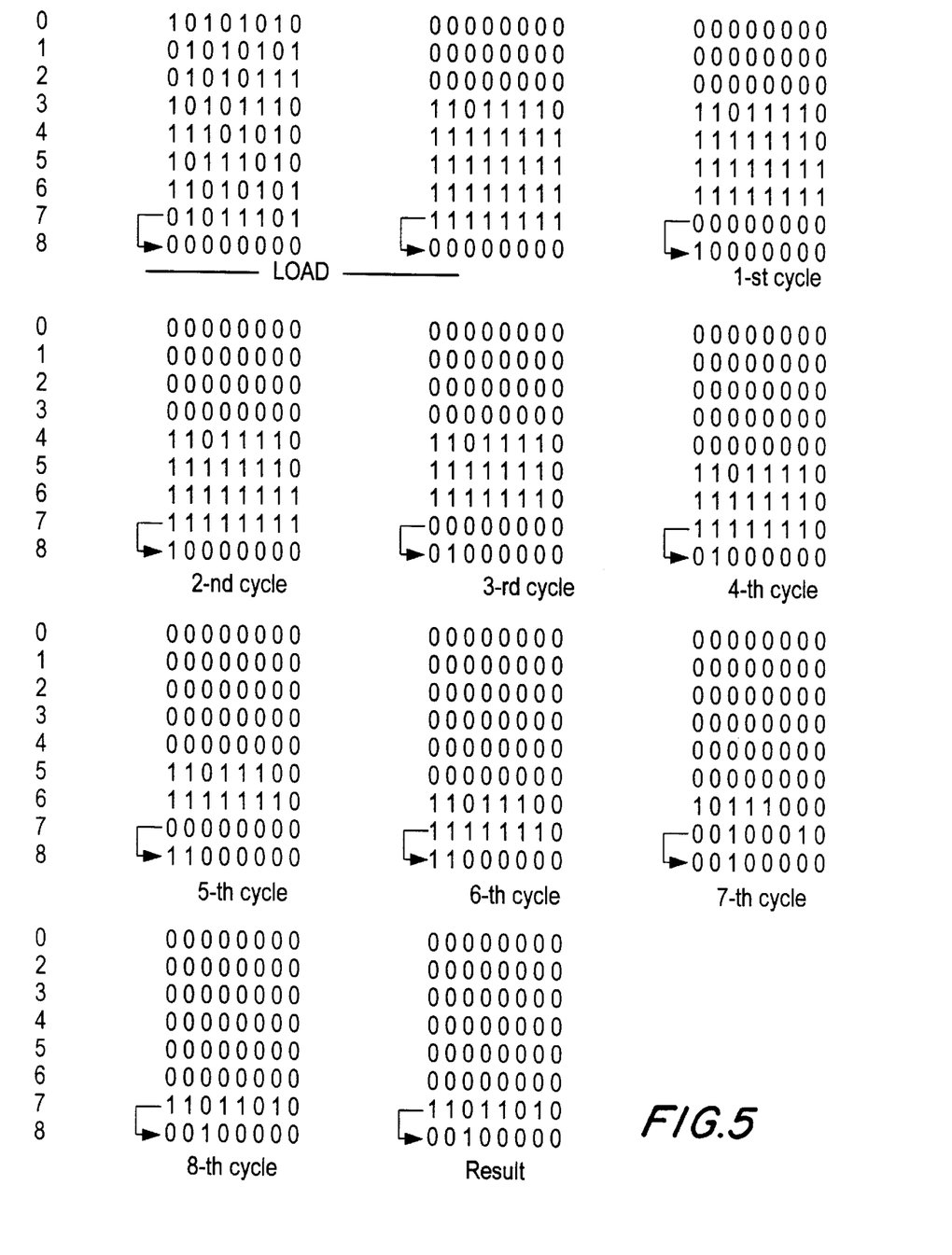
FIG. 5 shows the change of elements states at the work of the device, shown in FIG. 4 on the example of concrete numbers.

Numbers come on matrix lines herewith it doesn't matter in what sequence. Further clock by clock automated processing takes place, according to elements functions being implemented, which is shown in FIG. 5. in eight clock cycle we have $(10011011010)_2 = (1242)_{10}$ on external outputs.

In common case addition is carried out for 2*k clock cycles here k is number of summands and clock time doesn't exceed time of switching of typical logic element for selected production technology it is stipulated by that the device has regular uniform structure.

Hardware expenses of the device are equal to 67 flip flops if take into consideration that functions of elements are close to functions of flip flops.

Figure 6:
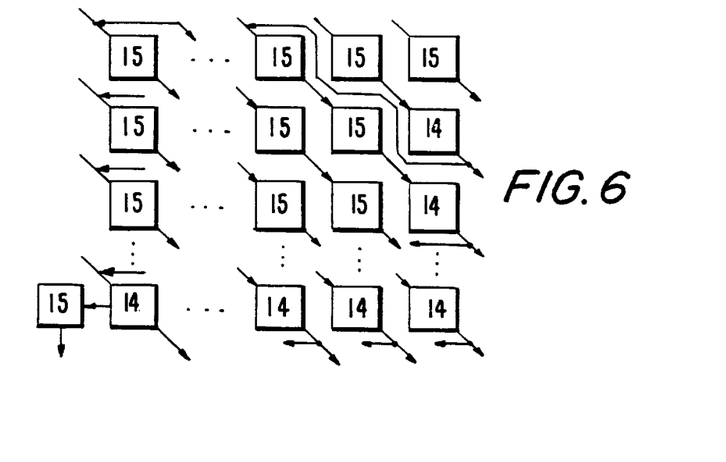
FIG. 6 shows the structural circuit of the device applicable to the computing partial product sums of one pair of $m_p$-capacity numbers, FIG. 7. shows the circuit of the device for computing partial product sums of 8-bit binary numbers, FIG. 8. shows the change of elements states at the work of the device given in FIG. 7 on the example of the concrete numbers.
Figure 7:
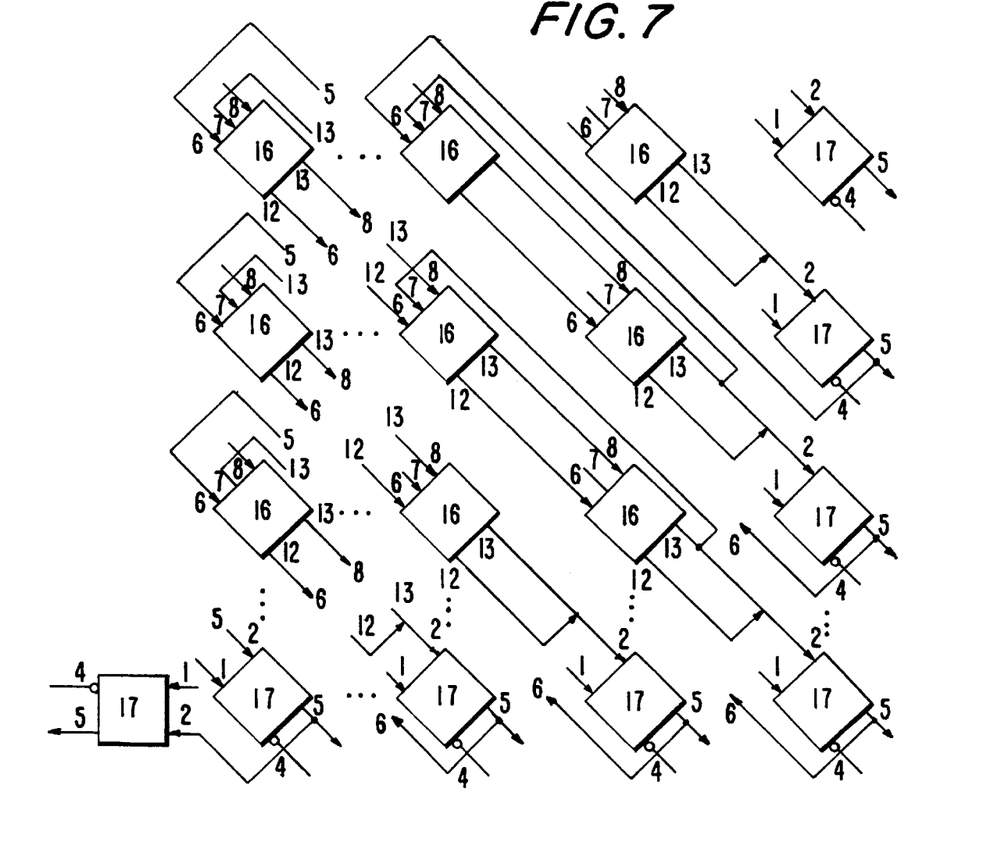
Figure 8:
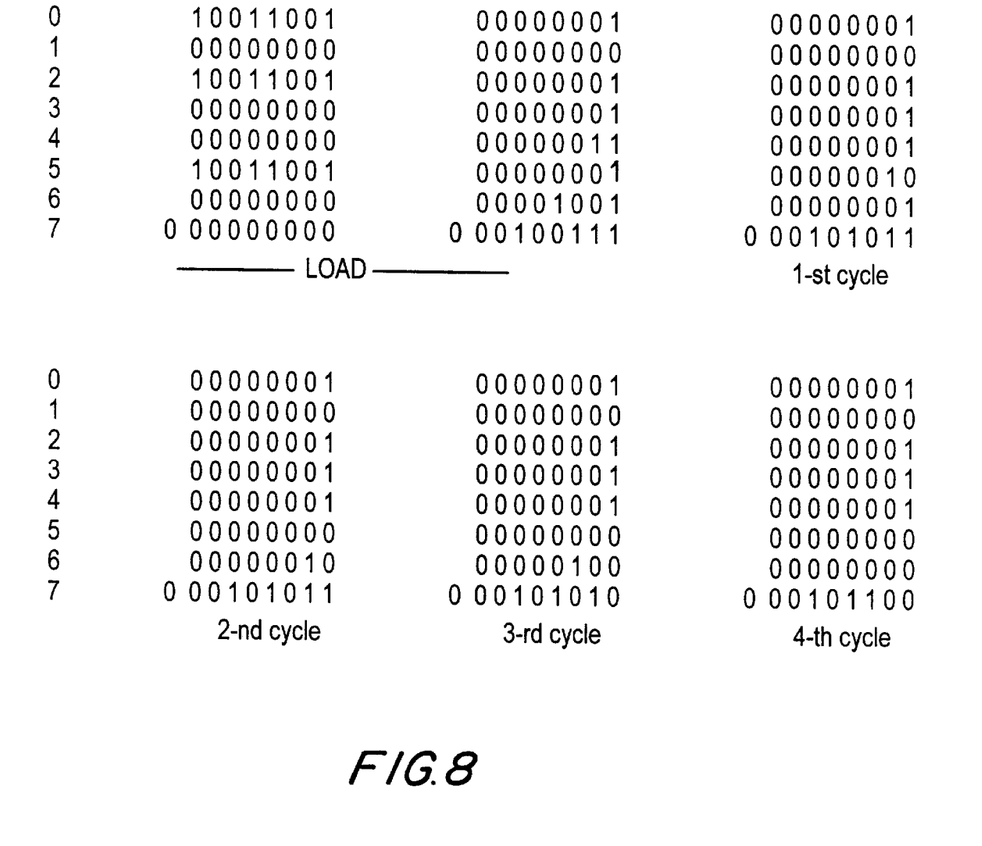

Functional analog for IIL technology has switching time of typical element 4 ns, cycle time makes 118 ns (great non-uniformity and non-regularity of computational structure), for computation of sum of eight 8-capacity components 12 cycles are necessary, total delay time is 1,416 ms, hardware: 14 coincidence-type three-input adders, 54 flip-flops, 8 multiplexers, 1 AND gate, 2 input buffer elements. Systolicity of the computational structure of the offered device and possibility of global synchro signal application allows to use high technologies and computing time of sum of eight 8-capacity numbers for typical logic element with switching time 0.01 ns make possible 0.16 ns. Device for computing product sums as applied for computing of sum of partial products is shown in FIG. 6, the device includes elements of the first type 14, elements of the second type 15. As to binary numbers, presented as discrete voltage levels in FIG. 7, the device includes elements of the second type 16, elements of the first type 17. The device operates as follows. Suppose it is necessary to multiplicate a pair of 8-bit numbers $(10011001)_2=(153)_{10}$ $(00100101)_2=(37)_{10}$ $(153*37=5661)$. Partial products are binary numbers: 10011001010, 0:0, 10011001, 0:0, 0:0, 10011001, 0:0, 0:0. Load of partial products takes place on matrix strings, according to their weights, partial product, having the lowest weight comes to the upper matrix string (FIG. 7). Further clock cycle-by-clock cycle handling proceeds automatically according to elements functions, as shown in FIG. 8. As a result at the fourth clock cycle in backing exits we have:

$(0001011000011101)_2=(5661)_{10}$. Hardware use makes 65 flip-flops.

Figure 9:
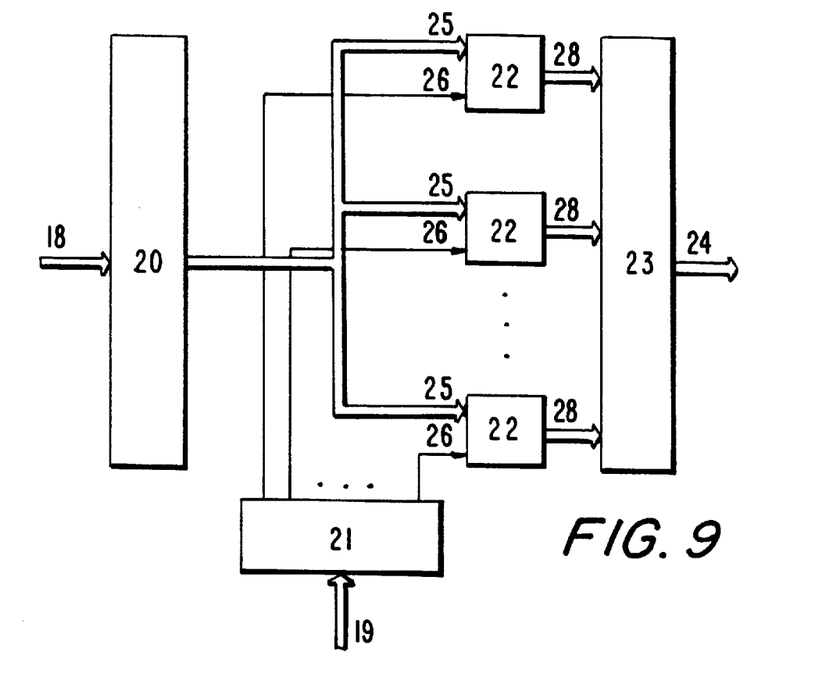
FIG. 9 shows the structural circuit of the device applicable to the multiplication of one pair of $m_p$-capacity numbers.
Figure 10:
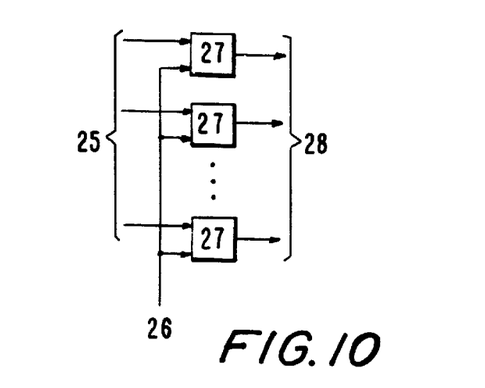
FIG. 10 shows the structural circuit of formation of binary partical products.
Figure 11:
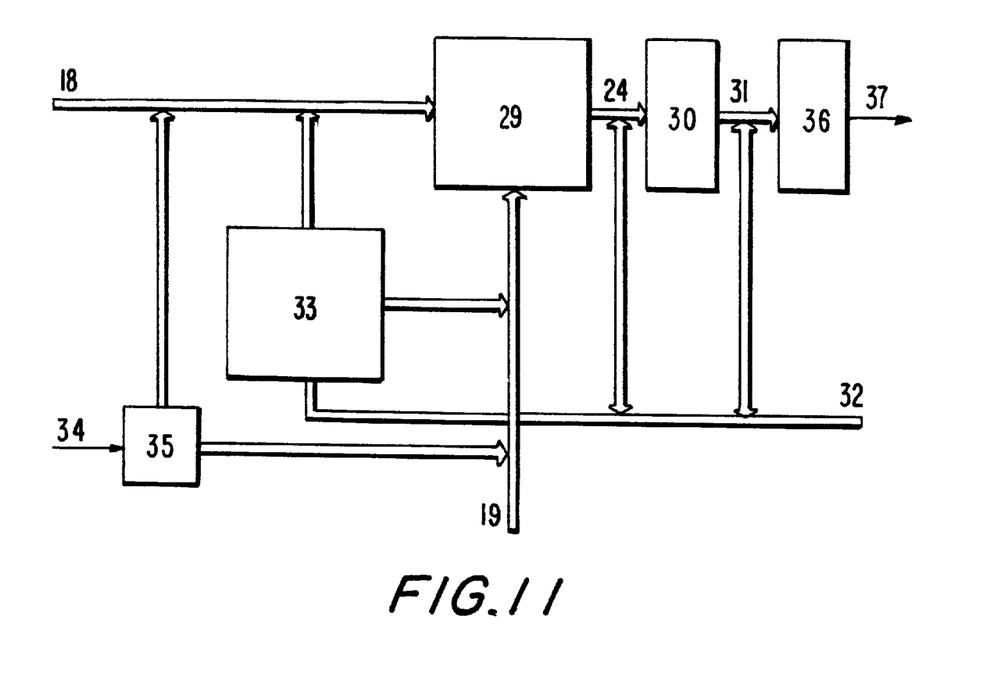
FIG. 11 shows the structural circuit of the general-purpose device (for case p=1, s=1, t=1) for digital signal processing for computing product sums, for multiplication and addition processes.

Functional analog carries out the same operation for two pairs for 1.9 ms at hardware use: 184 flip-flops, 60 one-bit coincidence-type three-input adders, 6 analysis circuits, 14 multiplexers. The offered device calculates the sum of partial products for $2*m_p$ clock cycles, here $m_p$ is capacity of partial products, possible delay time is 0.16 ns. As it was shown, number of clock cycles depends also on concrete numbers and may be lower than a limited number, that's why it is expedient to combine backing exits with the block of formation of signal of ready and output of result. The block is involved in stopping of signals changing at backing exits. Device for computing product sums is applicable for multiplication of one pair of $m_p$-capacity numbers, includes input $m_p$-capacity data bus of multiplicand register 18, input $m_p$-bus of multiplier register data 19, $m_p$-multiplicand capacity register 20, $m_p$-multiplier capacity register 21, $m_p$-circuits of partial products formation 22, block of computing of sums of partial products 23, $2*m_p$-output width bus of data 24. Block of partial products computing is shown in FIG. 6. Each $m_p$ circuit formation of partial products carries out operation "to multiplicate" of a multiplicand by $m_p$ multiplier's capacity, result of such operation is a partial product. Each circuit includes $m_p$-capacity input 25, one-capacity input 26, circuit body 27, $m_p$-capacity output 28. Applicable to binary numbers, presented as discrete binary layers of voltage, block of computing of sum of partial products is executed by circuit, shown in FIG. 7, $m_p$ circuit of partial products formation is executed as shown in FIG. 10. A body of $m_p$ circuit is $m_p$ of AND gates. The device operates as follows: A number 10011001 comes on the bus 18 to the register 20, number 00100101 passes along the bus 19 to the register 21, at logouts 22 partial products are being formed, weight whereof is taken into consideration by circuit coupling with relative matrix string of the block 23, the result is obtained by bus 24. In general case multiplication is carried out by $2*m_p$+2 clock cycles. The possible delay time for multiplication of a pair of 8-bit numbers is 0.18 ns. Hardware use herewith makes 80 flip-flops, 64 AND gates. Device for computing of sums of products for the case p=1, s=1, t=1 is shown in FIG. 11. The device includes a multiplication block 29, accumulator 30, output data bus 31, general data bus 32, memory block 33, input of analog signal 34, ADC 35, DAC 36, output of analog signal 37. Multiplication block 29 is shown in FIG. 9. Operands for multiplication may come from outside, from ADC, from the memory block, from the output bus 24, from output bus 31, operands for data summarization may come from the multiplication block, from the block of memory, from bus 31, from outside along the bus 32, so, the device may calculate sums of products of different configuration. For processing of dynamic signals with high accuracy with the help of discrete fast. Furrier transform it is necessary to calculate matrix for 1024 benchmarks, Basis-Polynomial transform allows to process such signals with 5–10 discrete counts. For 5 discrete counts transform allows to process signals, described by a function with two benchmarks of second type kink. With the purpose 15–20 multiplication operations and 12–16 summation operations will be necessary. In that case quantitative parameters of the device will have the following values: p=3,4, s=1, t=1. Herewith in each p transmission channel one of matrix multiplier is calculated. Sum of five products is calculated in each channel. Suppose, that time delay of the accumulator is 0.02 ns, than time for computing of transform by five benchmarks is above 1 ns. In parallel-pipelining of data processing the device for computing product sums allows to obtain results in interval, equal to time of switching of typical logic element.

I claim:

1. Method of computing product sums comprising the steps of:

a. sending l (l=1,2 . . . ) values of a signal parameter, l corresponding to k (k=2,3 . . . ) summands, to m (m=1, 2 . . . ) transmission channels, eg., (40), corresponding to the size of the summands;

b. dividing said l values by m by a divide-by-n circuit, (n=1,2 . . . ), n corresponding to a number system and determined by the quantity of all possible combinations of sets of l/m values of signal, each of the sets of l/m values of the signal parameter being sent to a transmission channel in accordance with weight;

c. transferring output of a transmission channel as input to a following transmission channel for each of the first m-1 transmission channels; and d. transferring output from the mth transmission channel to the input of an overflow transmission channel;

the product sum being obtained in outputs of (m+l) transmission channels as one sequence of a parameter values set.

2. Device for computing product sums according to the method of claim 1, which includes p (p=1,2 . . . ) blocks, each block comprising serially mounted first type members, eg., (14), having the function of the divide-by-n circuit, and second type members, eg., (15), having a single memory discharge circuit of working mode selection and clocking.

3. Device for computing product sums according to claim 2, which includes blocks of partial products formation circuits (22).

4. Device for computing product sums according to claim 3, which includes p1 inputs of analog signals (34), p2 analog-to-digital converters (35), a memory block (33), p3 digital-to-analog converters (36), and p4 outputs of analog signals (37).

5. Method of analog-to-digital and digital-to-analog processing transmission of Basis-Polynomial transform signals realized by the device according to claim 4, comprising the steps of:

a. obtaining multidimensional information in the form of analog signals (34);

b. digitizing the analog signals by analog-to-digital converters (35); and c. determining the frequency, constant components, and the progressiveness (changing of amplitude and constant component in time) of the digitized signals, whereby filtration distinguishing/decoding is produced, further digital-to-analog processing is produced, and data transmission is carried out.

* * * * *